United States Patent [19]

Dugua

[11] Patent Number: 4,530,823

[45] Date of Patent: Jul. 23, 1985

[54] URANIUM PEROXIDE IN THE FORM OF SPHERICAL PARTICLES HAVING GOOD FLOWABILITY AND PROCESSES FOR PREPARING SAME

[75] Inventor: Jacques Dugua, Vernaison, France

[73] Assignee: Produits Chimiques Ugine Kuhlmann, Paris, France

[21] Appl. No.: 379,336

[22] Filed: May 18, 1982

[30] Foreign Application Priority Data

Jun. 19, 1981 [FR] France ............................ 81 12081

[51] Int. Cl.$^3$ ............................................. C01G 43/00
[52] U.S. Cl. ........................................ 423/260; 423/16
[58] Field of Search ................................. 423/16, 260

[56] References Cited

U.S. PATENT DOCUMENTS

| | | | |
|---|---|---|---|
| 2,770,521 | 11/1956 | Spiegler | ................................. 423/16 |
| 3,697,441 | 10/1972 | Petit et al. | ............................. 423/16 |
| 4,152,395 | 5/1979 | Börner et al. | ........................ 423/16 |

FOREIGN PATENT DOCUMENTS 1187352  9/1959  France .

OTHER PUBLICATIONS

Yamine et al., *Proc. Ind. Aust. Chem. Eng. Conf., Eighth*, (Aug. 1980) at Melbourne, Australia, pp. 129–133.
*Chem. Abst.*, 54, Abst. #21897e (1960).

*Primary Examiner*—Edward A. Miller
*Attorney, Agent, or Firm*—Brooks Haidt Haffner & Delahunty

[57] ABSTRACT

A process for preparing uranium peroxide in a fluidized bed by precipitation of a uranium peroxide solution obtained from the reaction of uranyl sulfate or uranyl nitrate solutions having a concentration of uranium between about 0.5 and 300 g/L and a hydrogen peroxide solution having a concentration of from about 5 to about 70% by weight at a pH of from about 2.5 to about 4 and a temperature of from about 0° to about 60° C.; together with the easily handled uranium peroxide product so produced, these products being characterized by their substantially spherical form, their mean diameter of from about 30 to about 130 microns, their untamped bulk density of about 1.9 to about 2 g/cm$^3$, and their Carr scale flowability of at least 95, with a sodium ion content below 300 ppm, such uranium peroxides being useful intermediates for producing nuclear fuel with great safety of manipulation and low sodium content.

6 Claims, 3 Drawing Figures

100 μm

100 μm

URANIUM PEROXIDE IN THE FORM OF SPHERICAL PARTICLES HAVING GOOD FLOWABILITY AND PROCESSES FOR PREPARING SAME

BACKGROUND OF THE INVENTION

The present invention relates to an improved uranium peroxide and processes for preparing same from uraniferous solutions, and more particularly, it relates to uranium peroxide in the form of substantially spherical particles with well-defined particle size having an increased apparent bulk density and a very good flowability, as well as to a process for obtaining such uranium peroxides by crystallization and agglomeration starting from uraniferous solutions.

Uranium peroxide is a uraniferous concentrate which can be used in plants for the conversion of uraniferous concentrates to uranium fluoride or uranium oxide, which are useful for the preparation of nuclear fuels. Their great advantage with respect to prior art concentrates such as sodium uranate is that they do not contain sodium ions. Such sodium ions are in effect increasingly proscribed in plants for refining uranium-containing concentrates.

The production of uranium-bearing concentrates not containing sodium has generally become necessary in recent years. The conversion of uranium-containing concentrates containing sodium uranate, products actually from a certain number of treatment facilities for uranium minerals, to uranium peroxide is a means of eliminating the sodium ions. After dissolution of the sodium uranate in sulfuric acid, the uranium-containing solution so obtained can be treated with hydrogen peroxide to precipitate the uranium peroxide.

According to the prior art extraction technique described for example by R. Merrit in *The Extraction Metallurgy of Uranium*, Library of Congress Catalog, pages 240–246, the uranium contained in uranium-bearing minerals is recovered, after chemical attack of the minerals, and purification and concentration of the resulting uranium-bearing solution, in the form of acid liquors, for example, in a medium of sulfate ions. The uranium-containing concentrate can be obtained, starting from these solutions, by precipitation with the use of hydrogen peroxide, in the form of uranium peroxide. This is a well-known operation which is so described in U.S. Pat. No. 2,770,521, and it is used commercially only with relatively concentrated solutions resulting from the elution of uranium on a resin or from solvent extraction of the uranium, that is to say, from solutions containing at least about 10 g/L of uranium.

Upon treatment of the uranium-bearing solutions by hydrogen peroxide according to the prior art process, the precipitation takes place in agitated vessels disposed in series. The pH is maintained between 2.5 and 4 and the temperature is maintained between 30° and 65° C. The uranium peroxide precipitate so obtained is very fine and difficult to filter and to dry. The particles have a size of between 0 and 10 μm, with an irregular shape which leads to bad flowability. The handling of such products creates health problems and security problems because of the emission of uranium-rich dusts, both in plants for producing uranium-bearing concentrates, at the time of drying and of placing the material in solid casks, and in refining plants which recover these uranium-bearing concentrates to purify them and convert them into oxide, fluoride, and metal.

There accordingly exists a considerable commercial need for a treatment process for uranium-bearing solutions leading to a uranium-bearing concentrate in the form of uranium peroxide which does not contain sodium ions and which exhibits a great ease of filtration and a great security of handling without the emission of uranium-rich dusts.

THE INVENTION

The present invention accordingly fulfills the foregoing need and provides a process permitting the quantitative recovery of uranium, starting from uranium-bearing solutions, in the form of uranium peroxide of a purity conforming to commercial specifications for uraniferous concentrates. The uranium-bearing solutions treated are in general solutions of uranyl sulfate, although uranyl nitrate solutions can equally well be treated according to the present invention.

Briefly, the present invention utilizes the fluidized bed technique described in French Pat. No. 1,187,352 of PCUK. This technique comprises the formation of polycrystalline agglomerates by precipitation of a supersaturated solution in the presence of a solid support represented by fluidized particles coming from the nucleation and the growth of the solute. The seeds formed grow and join either among themselves or on pre-existing agglomerates. These fine particless and these agglomerates are maintained in suspension by means of a given supply of precipitated uraniferous solution or from recycled mother liquor. The state of supersaturation is kept constant through a continual supply of substance to be crystallized.

The uranium bearing solution, as well as the hydrogen peroxide solution, are deliberately distributed at different levels in the fluidized bed so as to obtain total precipitation of the uranium. The pH of precipitation of the uranium peroxide is from about 2.5 to about 4, and in certain preferred embodiments, is from about 3 to about 3.5.

The practice of the present invention is further illustrated by the accompanying drawings wherein.

Figure 1:
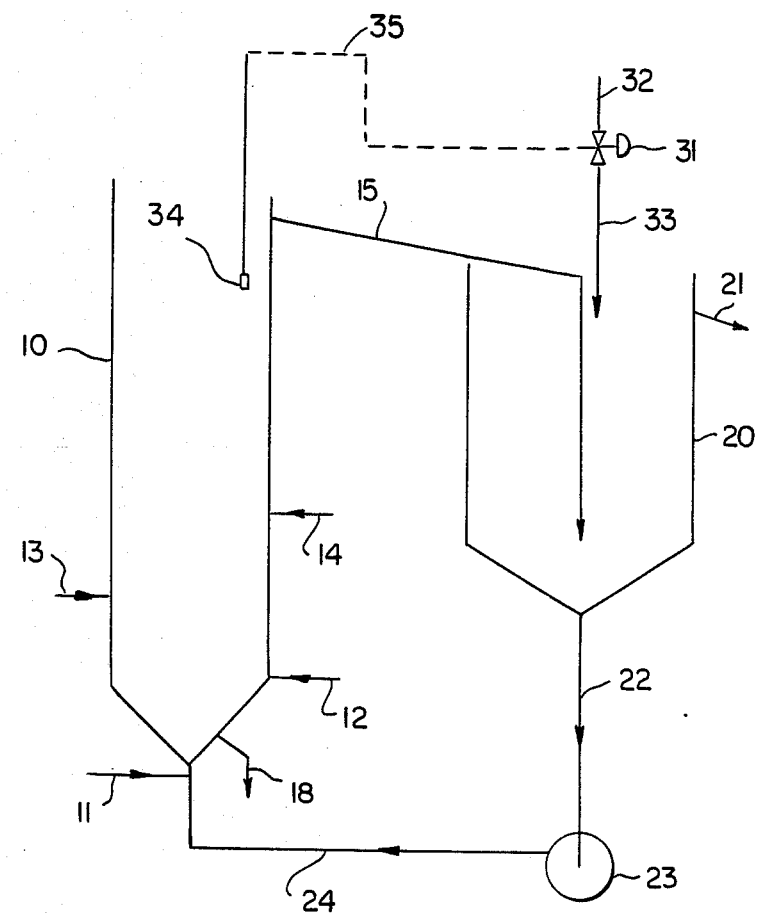
FIG. 1 is a schematic illustration of one of the preferred embodiments of the process.

The pH is maintained in the desired range, such as between 3 and 3.5, by the automatic addition of an alkaline solution through the action of an electrode and a pH regulator. The alkaline solution can be a solution of sodium hydroxide or potassium hydroxide or an ammoniacal solution. This permits the neutralization of the hydrogen ions liberted at the time of peroxide precipitation.

The concentration of the hydrogen peroxide solution introduced is between 5% and 70% by weight. In the case where uranyl sulfate solutions are treated, the excess hydrogen peroxide in the mother liquor extracted in the uranium after precipitation of peroxide is a function of the sulfate ions in the initial uranium-bearing solution. To obtain quantitative precipitation of the uranium, the excess hydrogen peroxide in the mother liquor can vary from 0.2 g/L for some low-sulfate ion uranium-bearing solutions to 2 or 3 g/L for uranium-bearing solutions saturated with sulfate ions.

The loss of hydrogen peroxide by decomposition during the uranium peroxide precipitation reaction can be reduced through the use of well-known hydrogen peroxide stabilizers in acid media, as for example, among others, dipicolinic acid or ethylenediaminetetraacetic acid.

The precipitation temperature is desirably maintained at from 0° to 60° C., and in certain preferred embodiments, it is maintained between 20° and 40° C.

The present invention permits the treatment of uranium-bearing solutions with widely different initial concentrations of uranium. The process of this invention is applied in effect to uranium-bearing solutions arising from the elution of uranium from a resin or from solvent extraction of uranium, that is to say, solutions containing from about 10 to about 50 g/L of uranium. It is equally applicable to uranium-bearing solutions directly derived by the attack on minerals of sulfuric acid which contain on the order of 0.5 to 1 g/L of uranium.

These sulfuric acid solutions from the attack of uranium-bearing minerals must be first treated with an alkaline agent, which is a hydroxide or a carbonate or mixture thereof, preferably the hydroxide or carbonate of calcium or their mixture, or a mixture of sodium hydroxide with a soluble calcium salt, at a pH of from about 2 to about 4, preferably at a pH between 2.5 and 3.5. It forms a precipitate containing the sulfates and the impurities of the initial solution, which precipitate is then separated. This preliminary treatment is the subject of French patent application No. 80.27867 of PCUK.

The sulfuric dissolution of uranium-bearing concentrates of the sodium uranate type, with the object of eliminating sodium ions, leads to concentrated uranium-bearing solutions containing on the order of from 100 to 300 g/L of uranium. In these cases, the process of the present invention is equally applicable. It can, however, be advantageous to dilute the uranium-bearing solution with mother liquor before its introduction into the fluidized bed in order to limit the amount of nucleation of the uranium peroxide.

A preferred continuous process according to the present invention is illustrated with reference to FIG. 1. Cylindro-conical crystallizer 10 fitted with an agitator (not shown) is fed with uraniferous solution through lines 11 and 13. Hydrogen peroxide solution is uniformly distributed into crystallizer 10 through conduits 12 and 14.

pH sensor 34 determines the pH of the solution in crystallizer 10 and is electrically connected through line 35 to valve 31. Valve 31 receives an alkaline material, in certain desirable embodiments an alkali metal hydroxide, such as potassium hydroxide or preferably sodium hydroxide, or an ammoniacal solution, from line 32 and feeds the required quantity into decanter 20 through line 33.

Overflow liquor from crystallizer 10 flows through line 15 to decanter 20, where a part of the mother liquor is removed through line 21 and the remainder is fed through conduit 22 to pump 23 which returns recycle mother liquor through line 24 to crystallizer 10. The uranium peroxide particles produced are removed at regular intervals through line 18. This removal can be regulated to provide a constant charge of uranium in crystallizer 10.

Figure 3:
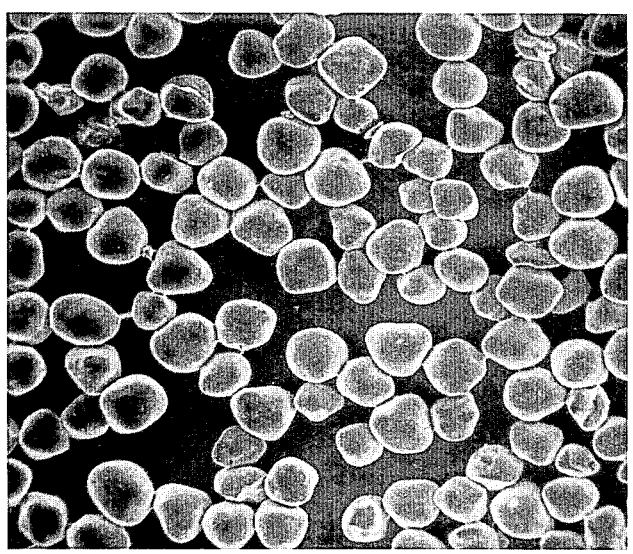
FIG. 3 is a photomicrograph of the novel uranium peroxide obtained according to the present invention.

The uranium peroxide obtained according to the present invention has the form of substantially spherical agglomerates such as are shown in FIG. 3. The mean diameter of these agglomerates is from about 30 to about 130 microns and in preferred embodiments of the invention, more particularly from 40 to 80 microns, which provides them with a high flowability. Their apparent untamped bulk density, measured according to standard NF 95-111 of February 1977, is from 1.9 to 2 g/cm$^3$. At the time of their handling, there is no emission of fine very light particles susceptible to pollution of the ambient atmosphere and consequent inconvenience to the users. The flowability according to the R. L. Carr test described in the Jan. 18, 1965 *Chemical Engineering*, page 163, has a value equal to or greater than 95 for the uranium peroxide obtained according to the present invention, whereas the uranium peroxide precipitated in a series of cascaded vessels according to the usual procedure has only a flowability of from 30 to 35.

Moreover, the present invention permits obtaining uranium peroxide having a very low sodium content, specifically less than about 300 ppm, notably in the case of converting sodium uranate-based uranium-bearing concentrates to uranium peroxide, whereas with the prior art procedures, the amount of sodium is usually greater than 1200 ppm.

All parts, percentages, proportions and ratios herein are by weight, unless otherwise indicated.

The following Examples are given to illustrate embodiments of the invention as it is presently preferred to practice it. It will be understood that these Examples are illustrative, and the invention is not to be considered as restricted thereto except as indicated in the appended claims.

COMPARATIVE EXAMPLE I

A solution of uranyl sulfate containing 25 g/L of uranium and 80 g/L of sulfate ions is continuously treated with hydrogen peroxide in a series of four agitated crystallizers having a unit volume of 160 ml and disposed in series. The precipitated uranium peroxide is maintained in suspension by an agitator rotating at 300 rpm. In the first crystallizer, a flow of 0.08 L/hr of uranium-bearing solution and 0.006 L/hr of 100 g/L hydrogen peroxide solution is introduced. The temperature of the precipitation is about 30° C. and the pH is maintained at 3.5 by the automatic addition of an ammonia solution. In order to improve the amount of precipitation, a 0.05 L/hr supply of a suspension containing 50% by weight of uranium peroxide obtained from prior operations is fed to the first crystallizer.

The concentration of uranium in the uranium-bearing solution decreases in each crystallizer. At the exit of the fourth reactor, the impoverished mother liquor contains about 20 to about 30 mg/L of dissolved uranium and about 1.3 g/L of excess hydrogen peroxide.

Figure 2:
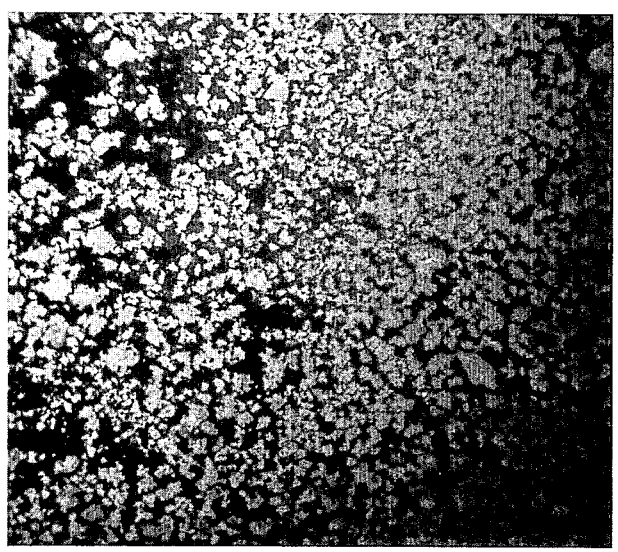
FIG. 2 is a photomicrograph of uranium peroxide produced according to the prior art.

The uranium peroxide recovered after filtration, washing and drying has a grain size from about 1 to about 15 microns (as shown in FIG. 2) and its flowability measured by the Carr test is from about 30 to 35. Its apparent untamped bulk density is 1.35 g/cm$^3$, and its sodium content is 1300 ppm.

EXAMPLE II

In a cylindro-conical crystallizer, as shown in FIG. 1, having a diameter of 0.08 m and a height of 0.6 m, a flow of 16 L/hr of mother liquor of crystallization of uranium peroxide identical to that in Example I is circulated from the base. The crystallizer is equipped with an agitator rotating at 25 rpm. The crystallizer is fed with a solution of uranyl sulfate containing 34 g/L of uranium and 62 g/L of sulfate ions by means of conduits 11 and 13, respectively, at respective rates of 0.7 and 0.3 L/hr.

A 0.080 L/hr volume of a 100 g/L solution of hydrogen peroxide is uniformly distributed by conduits 12 and 14. The pH is maintained at 3.5 by means of the automatic addition of a solution of 4 N sodium hydroxide which is introduced into the recycle circuit of the mother liquor via valve 31. The mother liquor leaving the crystallizer passes through decanter 20, one part is removed through conduit 21 and the remainder is recycled through pump 23. The temperature is maintained at 30°–35° C.

During the course of the precipitation of the uranium peroxide, the particles grow and reach a certain size. When their size is considered to be sufficient, the particles of uranium peroxide are removed at regular intervals through conduit 18 so as to maintain permanently a charge of approximately one kilogram of uranium in the crystallizer.

The uranium peroxide obtained has the following characteristics as shown in FIG. 3. The mean size is from about 40 to about 70 microns, the apparent untamped bulk density is 1.92 g/cm$^3$, the flowability according to the Carr test is 96, and the sodium content is 290 ppm.

The concentration of dissolved uranium is on the order of from 5 to 10 mg/L in the withdrawn mother liquor, for an excess hydrogen peroxide of 2 to 3 g/L.

EXAMPLE III

This is carried out as in Example II, but with a uranium solution containing 130 g/L of uranium. The solution is obtained by dissolving sodium uranate in a sulfuric acid solution. A flow of 0.6 L/hr of uranium-bearing solution is fed and distributed through conduits 11 and 13, respectively, at rates of 0.4 L/hr and 0.2 L/hr. The latter feed is diluted with 0.8 L/hr of mother liquor in conduit 13 so as to limit the amount of nucleation of uranium peroxide during the precipitation. The hydrogen peroxide and sodium hydroxide solutions are fed as above at a rate permitting maintaining about 2 to 3 g of excess hydrogen peroxide in the mother liquor and also maintaining the pH from about 3.3 to 3.5.

The concentration of uranium dissolved in the withdrawn mother liquor is from about 5 to 10 mg/L.

The precipitated uranium peroxide under these conditions has the same characteristics as in preceding Example II. The sodium content is about 220 ppm.

EXAMPLE IV

This Example is conducted under the same conditions as in Example II, but the uranium-bearing solution is a solution resulting from the dissolution of minerals, wherein the impurities have previously been eliminated with calcium hydroxide at a pH of 3.5 according to the technique described in the aforesaid French patent application No. 80/27867. The uranium-bearing solution contains 0.9 g/L of uranium and 14 g/L of sulfate ions. The uraniferous solution is fed through conduit 11 at the rate of 35 L/hr. The flow of recycle mother liquor is 7 L/hr. The solutions of hydrogen peroxide and sodium hydroxide are fed as above at a rate permitting maintaining about 0.2 to 0.25 g/L of hydrogen peroxide in the mother liquor as well as maintaining the pH between 3.3 and 3.5.

The precipitation of uranium is total, the mother liquor containing less than 2 mg/L of uranium in solution.

The characteristics of the uranium peroxide obtained are the same as those in Example II. The particles are smooth and substantially spherical.

The absence of fine particles in these products, their apparent elevated bulk density, and their good flowability provide that their handling is easy and not dangerous. Their sodium content is about 200 ppm.

What is claimed is:

1. A process for the preparation of uranium peroxide which comprises establishing a fluidized bed in a zone containing a supersaturated uranium peroxide mother liquor solution containing fine uranium peroxide crystals obtained by reaction of a solution selected from the group consisting of uranyl sulfate and uranyl nitrate solutions having a concentration of uranium of from about 0.5 to about 300 g/L and a solution of hydrogen peroxide having a concentration of from about 5 to about 70% by weight, wherein the crystals are maintained in a solid/liquid fluidized state by the continuous upward movement of the supersaturated solution, precipitating uranium peroxide at a pH of from about 2.5 to about 4 and at a temperature of from about 0° to about 60° C., and withdrawing uranium peroxide particles so formed as substantially spherical grains with a mean diameter of from about 30 to about 130 microns from the fluidized bed.

2. A process according to claim 1 wherein the pH is from about 3 to about 3.5.

3. A process according to claim 1 wherein the temperature is from about 20° to about 40 ° C.

4. A process according to claim 1 wherein excess hydrogen peroxide is present in the solution.

5. A process according to claim 4 wherein the excess of hydrogen peroxide is from about 0.2 g/L to about 3 g/L.

6. A process according to claim 1 wherein the solution contains dipicolinic acid or ethylenediaminetetracetic acid as a peroxide stabilizer.

* * * * *